(12) United States Patent
Cho et al.

(10) Patent No.: US 8,862,311 B2
(45) Date of Patent: Oct. 14, 2014

(54) SYSTEM AND METHOD FOR MEASURING INCLINATION OF VEHICLE

(71) Applicants: Hyundai Motor Company, Seoul (KR); Kia Motors Corporation, Seoul (KP)

(72) Inventors: Jinkuk Cho, Gyeonggi-do (KR); Yong Kak Choi, Seoul (KR); Il Kwon Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/727,112

(22) Filed: Dec. 26, 2012

(65) Prior Publication Data
US 2014/0032036 A1    Jan. 30, 2014

(30) Foreign Application Priority Data

Jul. 30, 2012    (KR) .................... 10-2012-0083192

(51) Int. Cl.
| | | |
|---|---|---|
| G06F 7/00 | (2006.01) | |
| G06F 11/30 | (2006.01) | |
| G01C 9/00 | (2006.01) | |
| B60T 8/172 | (2006.01) | |
| G06F 17/00 | (2006.01) | |
| G01P 15/08 | (2006.01) | |

(52) U.S. Cl.
CPC ...... *G06F 17/00* (2013.01); *G01C 9/00* (2013.01); *B60T 8/172* (2013.01); *G01P 15/08* (2013.01)
USPC ............................................. 701/29.1

(58) Field of Classification Search
CPC ........... B60R 2021/0018; B60R 2021/01306; B60R 2021/01327; G01C 9/00; G01C 19/42; G01C 2009/00; G01P 11/00
USPC .......... 701/29.1, 36; 702/141–142, 150, 154; 340/425.5, 429
See application file for complete search history.

(56) References Cited

U.S. PATENT DOCUMENTS

2002/0019719 A1 *    2/2002    Kueblbeck et al. ........... 702/147

FOREIGN PATENT DOCUMENTS

| JP | 2006-113264 A | 4/2006 |
|---|---|---|
| JP | 2007-047081 A | 2/2007 |
| JP | 2007232662 A | 9/2007 |
| JP | 2008-281508 A | 11/2008 |
| JP | 05-139133 B2 | 2/2013 |
| KR | 10-2000-0031712 | 6/2000 |
| KR | 10-2004-0005146 | 1/2004 |
| KR | 10-0792908 | 1/2008 |
| KR | 10-2011-0109606 | 10/2011 |

* cited by examiner

*Primary Examiner* — Yonel Beaulieu
(74) *Attorney, Agent, or Firm* — Edwards Wildman Palmer LLP; Peter F. Corless

(57) ABSTRACT

The present invention relates to a system and a method for measuring an inclination of a vehicle using an acceleration sensor, which may improve response performance of inclination measurement by adjusting to a driving state of the vehicle. The system includes: a high pass filter configured to high pass filter an output signal of the acceleration sensor that senses a driving acceleration of a vehicle; and a controller configured to deduct the output signal of the acceleration sensor filtered by the high pass filter from an original output signal of the acceleration sensor, calculate a deducted output signal of the acceleration sensor of a predetermined cutoff frequency or lower; and calculate an inclination based on the deducted output signal of the cutoff frequency or lower of the acceleration sensor.

12 Claims, 9 Drawing Sheets

SYSTEM AND METHOD FOR MEASURING INCLINATION OF VEHICLE

CROSS-REFERENCE TO RELATED APPLICATION

This application claims priority to and the benefit of Korean Patent Application No. 10-2012-0083192 filed in the Korean Intellectual Property Office on Jul. 30, 2012, the entire contents of which are incorporated herein by reference.

BACKGROUND OF THE INVENTION (a) Field of the Invention

The present invention relates to a system and a method for measuring an inclination of a vehicle, and more particularly, to a system and a method for measuring an inclination of a vehicle, which can measure an inclination by adjusting to a driving state of a vehicle.

(b) Description of the Related Art

In general, when a vehicle is driven on an inclined surface with respect to a reference surface, the vehicle travels in an inclined state. An inclination along a driving direction of the vehicle is used for various purposes. For example, an inclination may be utilized for improving fuel efficiency and determining a shift pattern of a vehicle. Further, an inclination of a road may be utilized for preventing a vehicle from sliding upon turning on the engine. Further, an inclination of a vehicle may be used for determining a driving route of navigation, controlling a position of a vehicle, improving fuel efficiency of a vehicle, detecting real-time energy consumption of a vehicle, and the like.

The inclination may be measured by various methods, such as an atmospheric pressure sensor, an acceleration sensor, an electronic compass, and a gyro sensor, but the acceleration sensor is most commonly used.

When an inclination angle is measured by using the acceleration sensor, a signal of the acceleration sensor may be filtered using a low pass filter (LPF). An example of a method of measuring an inclination by using an acceleration sensor and a low pass filter is illustrated in FIG. 1.

Referring to FIG. 1, a signal of an acceleration sensor is monitored (e.g., received) to measure an inclination, and an acceleration of a vehicle is calculated based on the signal of the acceleration sensor. Further, to remove a high frequency component and signal noise in the sensor of the acceleration sensor, the signal of the acceleration sensor is filtered with the low pass filter.

When the signal of the acceleration sensor is filtered with the low pass filter, the inclination is calculated based on the filtered signal of the acceleration sensor, and a final inclination value is output by filtering a signal of the calculated inclination value with the low pass filter to remove a noise signal in the calculated inclination value.

However, according to the aforementioned method of measuring the inclination, the low pass filter is used to remove the high frequency component and/or the noise signal in the signal of the acceleration sensor, the following problems may be incurred.

When a gain value of the low pass filter is increased to improve performance in a vehicle speed stabilization section, a delay of a response time may be generated as illustrated in FIG. 2. When the response time is delayed, a vehicle may be controlled with a previously measured inclination value at a location having no inclination.

On the contrary, when the gain value of the low pass filter is decreased to improve response performance, the high frequency component may be reflected to the inclination, thereby reducing reliability of the measured inclination.

Further, according to the method of measuring the inclination in the related art, since a plurality of filters are used in each filtering step to obtain a stable inclination, a measured inclination value may decrease compared to an actual inclination value.

The above information disclosed in this section is only for enhancement of understanding of the background of the invention and therefore it may contain information that does not form the prior art that is already known in this country to a person of ordinary skill in the art.

SUMMARY

The present invention has been made in an effort to provide a system and a method for measuring an inclination of a vehicle having advantages of improving response performance of the measurement of an inclination according to a driving state of a vehicle by efficiently removing a noise signal and a high frequency component of an acceleration sensor using a unique characteristic of a high pass filter (HPF) and a low pass filter (LPF).

Further, the present invention has been made in an effort to provide a system and a method for measuring an inclination of a vehicle having advantages of improving response performance of the inclination measurement according to a driving state of a vehicle by applying a rate limit for preventing a sudden change of the inclination and differentiating a filter gain value according to a driving speed of the vehicle.

An exemplary embodiment of the present invention provides a system for measuring an inclination of a vehicle by using an acceleration sensor, including: a high pass filter configured to filter an output signal of an acceleration sensor sensing a driving acceleration of a vehicle; a deduction unit configured to deduct the output signal of the acceleration sensor and calculate an output signal of the acceleration sensor of a predetermined cutoff frequency or lower; and a calculation unit configured to calculate an inclination based on the output signal of the cutoff frequency or lower of the acceleration sensor.

The system may further include: a low pass filter configured to filter a signal of the inclination calculated by the calculation unit; and an inclination output unit configured to output the signal filtered by the low pass filter as an inclination signal.

The system may further include an inclination change rate limit processing unit configured to output the signal value as an inclination signal of a value limited to a predetermined value when a change rate of the signal value of the inclination filtered by the low pass filter is equal to or larger than the predetermined value.

The system may further include: a vehicle speed sensor configured to sense a vehicle speed; and a filter gain adjusting unit configured to set a gain of the high pass filter or the low pass filter corresponding to the vehicle speed sensed by the vehicle speed sensor and apply the set gain to the high pass filter or the low pass filter.

Another exemplary embodiment of the present invention provides a method of measuring an inclination of a vehicle by using an acceleration sensor, including: filtering an output signal of an acceleration sensor that senses a driving acceleration of a vehicle with a high pass filter; deducting an original output signal of the acceleration sensor and the high pass filtered output signal of the acceleration sensor and calculating an output signal of the acceleration sensor of a predetermined cutoff frequency or lower; and calculating an inclination based on the output signal of the cutoff frequency or lower of the acceleration sensor.

The method may further include: filtering a signal of the calculated inclination with a low pass filter; and outputting a value of the low pass filtered signal of the inclination as an inclination signal of a value limited to a predetermined value when a change rate of the value of the low pass filtered signal of the inclination is equal to or larger than the predetermined value.

The method may further include: sensing a vehicle speed; and setting a gain of the high pass filter or the low pass filter corresponding to the vehicle speed and applying the set gain to the high pass filter or the low pass filter.

As described above, according to the exemplary embodiment of the present invention, by substantially removing a noise signal and a high frequency component of the acceleration sensor using a unique characteristic of the high pass filter (HPF) and the low pass filter (LPF), it may be possible to improve response performance of the inclination measurement according to a driving state of a vehicle.

Further, according to the exemplary embodiment of the present invention, when a change rate of an inclination exceeds a predetermined change rate according to identification of the change rate of the inclination, it may be possible to prevent a sudden change of the inclination by limiting the change rate of the inclination. Additionally, according to the exemplary embodiment of the present invention, it may be possible to improve response performance and reliability of an inclination measurement according to a driving state of a vehicle by differentiating a value of a filter gain according to a vehicle speed.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules/units and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

Figure 1:
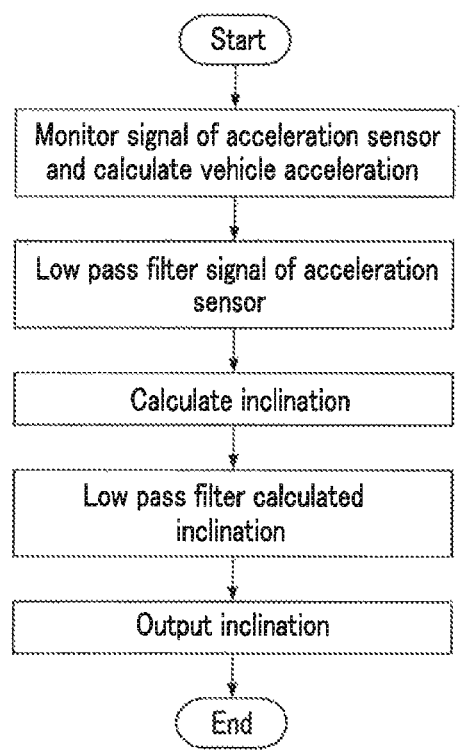
FIG. 1 is an exemplary flowchart of a method of measuring an inclination of a vehicle using an acceleration sensor according to the related art.
Figure 2:
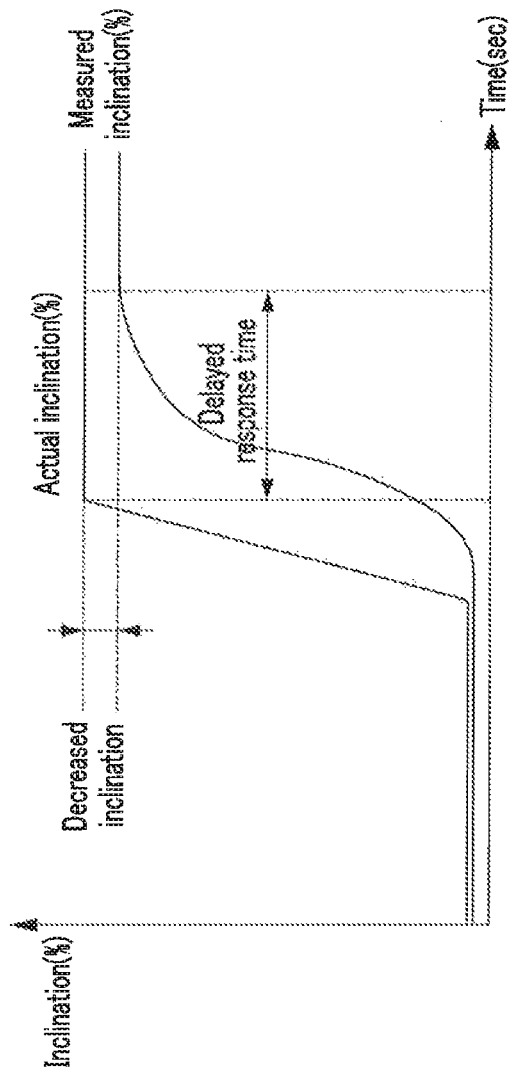
FIG. 2 is an exemplary graph for describing a problem of the method of FIG. 1.
Figure 3:
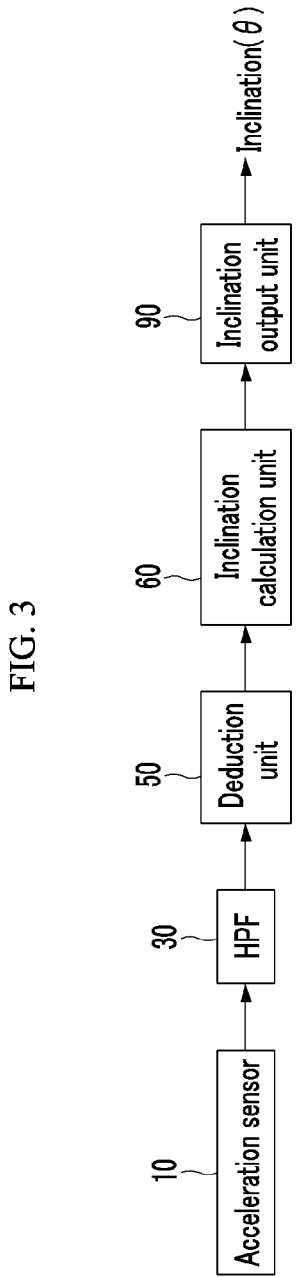
FIG. 3 is an exemplary diagram of a system for measuring an inclination of a vehicle using an acceleration sensor, according to an exemplary embodiment of the present invention.

FIG. 3 is an exemplary diagram of an system for measuring an inclination of a vehicle using an acceleration sensor, according to an exemplary embodiment of the present invention. Referring to FIG. 3, the present invention may include a high pass filter (HPF) 30 for high pass filtering an output signal of an acceleration sensor 10.

A deduction unit 50, controlled by a controller, may be connected to a rear end of the high pass filter 30. The deduction unit 50 may receive an original output signal (FIG. 4A) of the acceleration sensor 10 and an output signal (FIG. 4B) of the acceleration sensor 10 filtered by the high pass filter 30. The deduction unit 50 may calculate an output signal (FIG. 4C) of the acceleration sensor at a predetermined cutoff frequency or lower by receiving the original output signal and the output signal of the acceleration sensor and then deducting the signals. The deduction unit 50 may deduct the filtered output signal (FIG. 4B) of the acceleration sensor 10 from the original output signal (FIG. 4A).

Figure 4:
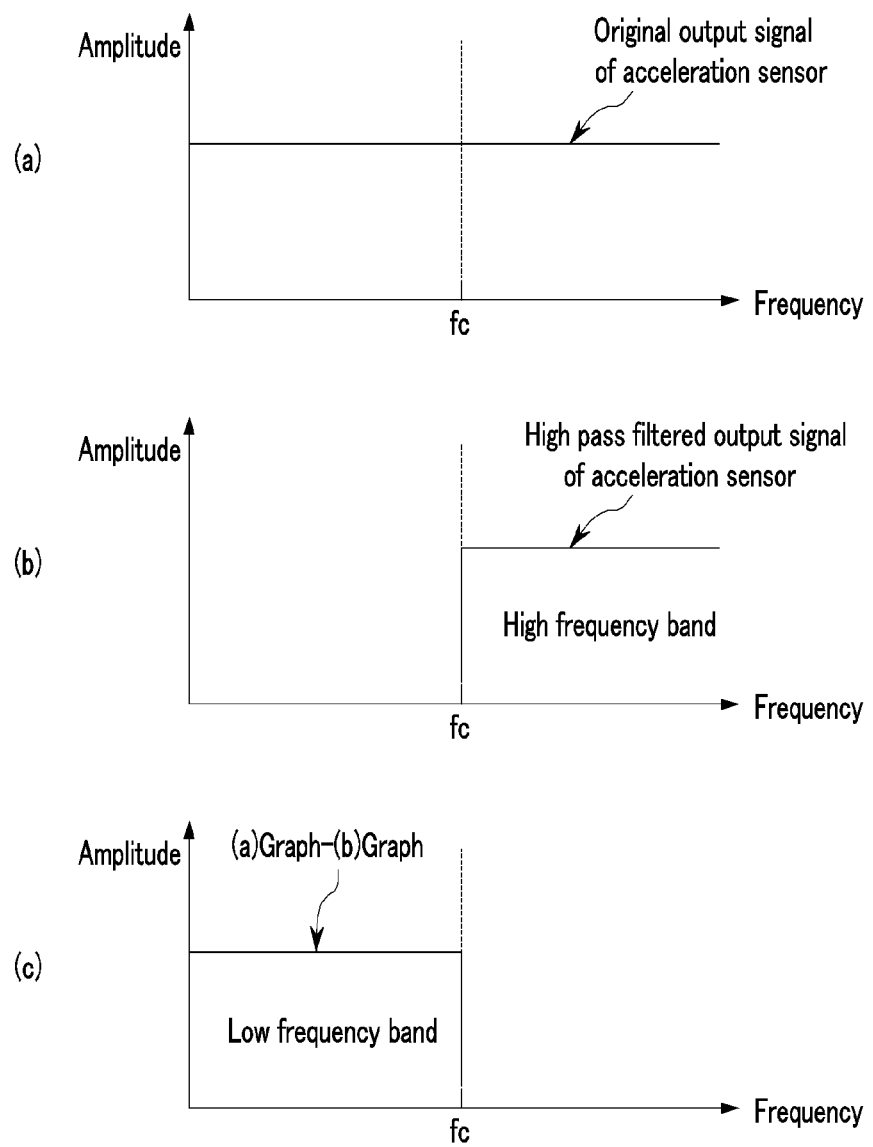
FIGS. 4A to 4C are exemplary graphs illustrating an operation of the system illustrated in FIG. 3, according to an exemplary embodiment of the present invention.
Figure 5:
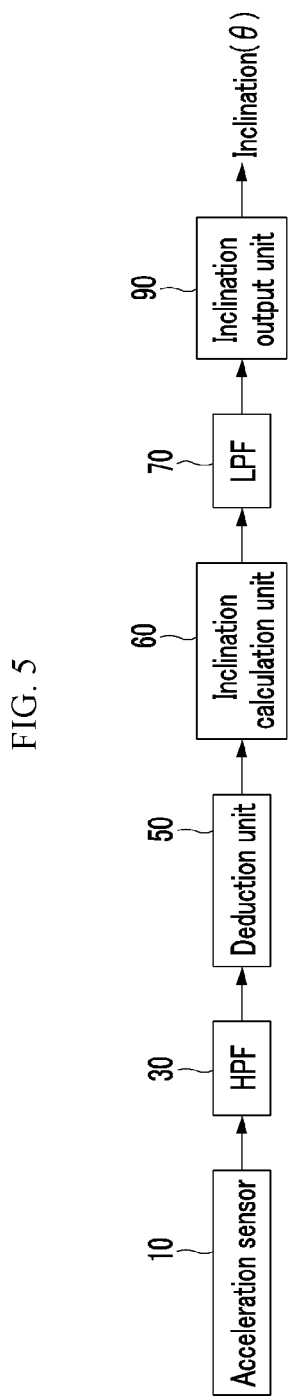
FIGS. 5 to 7 are exemplary diagrams of a system for measuring an inclination of a vehicle using an acceleration sensor, according to another exemplary embodiment of the present invention.

As can be seen from FIG. 4, FIG. 4C is a form the same as that of the signal passing the low pass filter. In other words, according to the exemplary embodiment of the present invention, the low pass filter in the related art may be used through the high pass filter 30, thereby preventing delay of a response time.

The signal output from the deduction unit 50 may be used as the input in an inclination calculation unit 60. The inclination calculation unit 60, controlled by the controller, may calculate an inclination by receiving the output signal of the deduction unit 50. In other words, the inclination calculation unit 60 may calculate and output the inclination based on the output signal of the deduction unit 50.

The output signal (e.g., an inclination angle) of the inclination calculation unit 60 may be transmitted to a location requiring vehicle acceleration through an inclination output unit 90. The output signal of the inclination calculation unit 60 may include a signal noise of a low frequency, thus, the low pass filter 90 may be used to reduce the signal noise between the inclination calculation unit 60 and the inclination output unit 90. The high frequency signal may be removed by the deduction unit 50, thus the noise signal of the low frequency is removed by the low pass filter 70.

Figure 6:
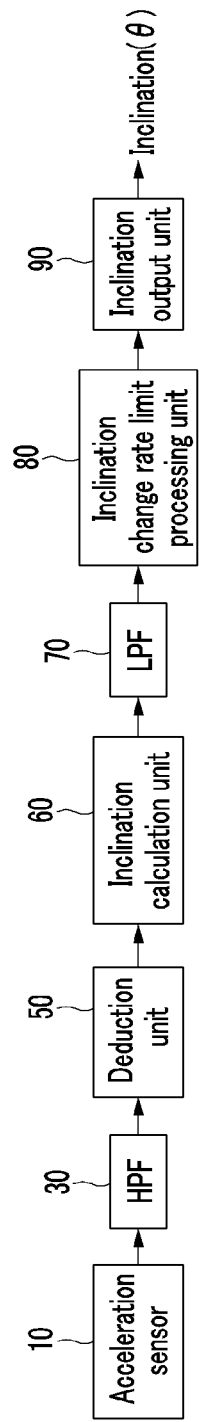

FIG. 6 is an exemplary diagram of a system for measuring an inclination of a vehicle by using an acceleration sensor, according to another exemplary embodiment of the present invention. Referring to FIG. 6, an inclination change rate limit processing unit 80, controlled by the controller, may be disposed between the low pass filter 70 and the inclination output unit 90.

When the value of the inclination signal filtered by the low pass filter 70 is equal to or larger than a predetermined value, the inclination change rate limit processing unit 80 may process the value of the filtered inclination signal into an inclination signal of a limited value with the predetermined value and input the processed inclination signal in the inclination output unit 90.

Even though the inclination signal filtered by the low pass filter 70 is a signal of a low frequency component, the stable signal may not be continuously output and the inclination signal may be abnormally and rapidly changed according to various factors,.

For example, an influence of in rush current applied to the vehicle, may cause the inclination change rate limit processing unit 80 to limitedly process the inclination signal having a rapid change rate.

Figure 7:
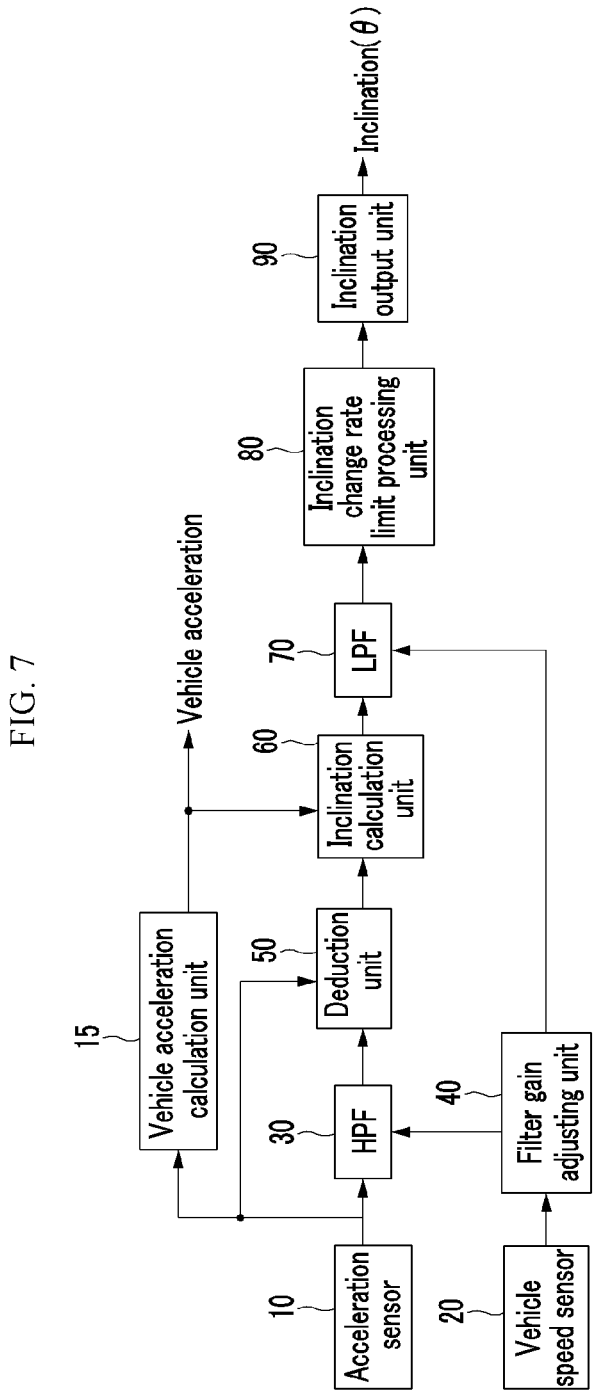
Figure 8:
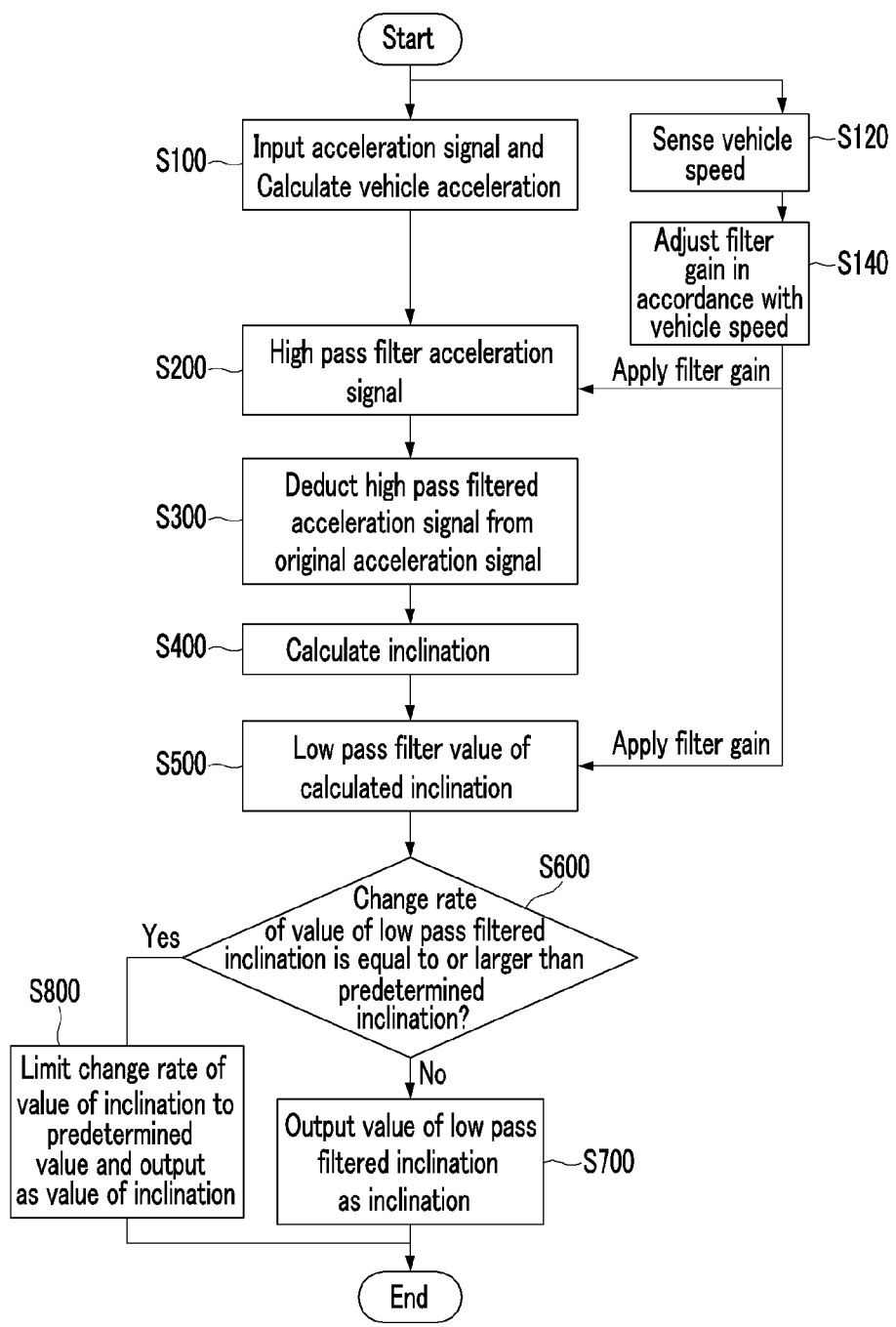
FIG. 8 is an exemplary flowchart of a method of measuring an inclination of a vehicle using an acceleration sensor, according to an exemplary embodiment of the present invention.

FIG. 7 is an exemplary diagram of an system for measuring an inclination of a vehicle by using an acceleration sensor, according to another exemplary embodiment of the present invention.

Referring to FIG. 7, compared to FIG. 6, the system for measuring an inclination of a vehicle by using an acceleration sensor may further include a vehicle speed sensor 20 (i.e., a sensor) that senses a vehicle speed and a filter gain adjusting unit 40 that sets the gains of the high pass filter 30 and/or the low pass filter 70 corresponding to the vehicle speed sensed by the vehicle speed sensor 20 and that applies the set gain to the high pass filter 30 and/or the low pass filter 70.

Illustrated in FIG. 7 is a vehicle acceleration calculation unit 15, controlled by the controller, that calculates an acceleration of the vehicle through the output signal of the acceleration sensor 10. The vehicle acceleration calculation unit 15 is not illustrated for simplicity of the drawings of FIGS. 3 to 6, but it may be obvious to those skilled in the art that the vehicle acceleration calculation unit 15 is necessary for the configuration of FIGS. 3 to 6.

The filter gain adjusting unit 40, controlled by the controller, may be used for differentiation of response performance during the inclination measurement for each vehicle speed due to a characteristic of a vehicle and a characteristic of a road.

In a low speed area and a middle speed area (e.g., 60 km/h or lower), in other words, a city area, a filter having fast response performance may be necessary due to sudden changes of an inclination of the road. Additionally, in the city area, the filter gain adjusting unit 40 may decrease the gain of the filter.

However, in a high speed area (e.g., greater than 60 km/h), in other words, a highway area, stability of a signal may be more important than the fast response performance an inclination change of the road may be less frequent. Accordingly, the filter gain adjusting unit 40 may increase the gain of the filter for a stable response.

An operation of the system and the method of measuring the inclination of the vehicle using the acceleration sensor, according to the exemplary embodiment of the present invention will be described with reference to the accompanying drawings. For example, to improve fuel efficiency of a vehicle and determine a shift pattern, corresponding control systems may measure an inclination of a current road.

When an output signal is generated from the acceleration sensor of the vehicle, a high frequency component and a noise may be included in the output signal of the acceleration sensor 10 by various electrical and mechanical factors. A filter may be used to remove the high frequency component and the noise, and when a large gain value of the filter is used for the improvement of stability, a response time increases.

On the contrary, when a small gain value of the filter is used for the improvement of response performance, the high frequency component may be reflected to the inclination, decreases reliability of the measured inclination value.

However, according to the exemplary embodiment of the present invention, an inclination may be measured without the aforementioned problem.

When a vehicle is running, an output signal may be generated in the acceleration sensor 10 and the output signal of the acceleration sensor 10 may be input in the vehicle acceleration calculation unit 15 and the high pass filter 30 (S100). The vehicle acceleration calculation unit 15, controlled by the controller, may calculate an acceleration of the vehicle based on the input of the output signal of the acceleration sensor 10 and may transmit the calculated acceleration of the vehicle to a location requiring the vehicle acceleration (S100).

The high pass filter 30 may remove a low frequency component of the output signal of the acceleration sensor 10 by high pass filtering the output signal of the acceleration sensor 10 and outputting only a high frequency component (S200).

In the exemplary embodiment of the present invention, a filter gain of the high pass filter 30 may be set as a default value, but the scope of the present invention is not limited thereto. For example, the filter gain of the high pass filter 30 may be set according to a vehicle speed. For example, when a vehicle speed is a middle low speed (e.g., 60 km/h or lower) the vehicle may be assumed to be traveling in a city area. Since an inclination of a road may suddenly change in a city area, a substantially fast response of the filter may be necessary. Accordingly, when confirmed that the vehicle speed sensed by the vehicle speed sensor 20 is a middle low speed, the filter gain adjusting unit 40, controlled by the controller, may decrease the gain of the high pass filter 30 to a predetermined value (e.g., a value smaller than a default value) (S140). Similarly, a filter gain of a relatively low value in the city area may be applied to the low pass filter 70 to be described later.

On the other hand, when the vehicle speed is a high speed (e.g., greater than 60 km/h) the vehicle may be assumed to be traveling on a highway. Since an inclination of a road may not be suddenly changed in the highway area, a response of the filter does not need to be fast. Accordingly, when confirmed that the vehicle speed sensed by the vehicle speed sensor 20 is a high speed, the filter gain adjusting unit 40, controlled by the controller, may increase the gain of the high pass filter 30 to a predetermined value (e.g., a value larger than a default value) (S140). Similarly, a filter gain of a relatively high value in the highway area may be applied to the low pass filter 70 to be described later.

Figure 9:
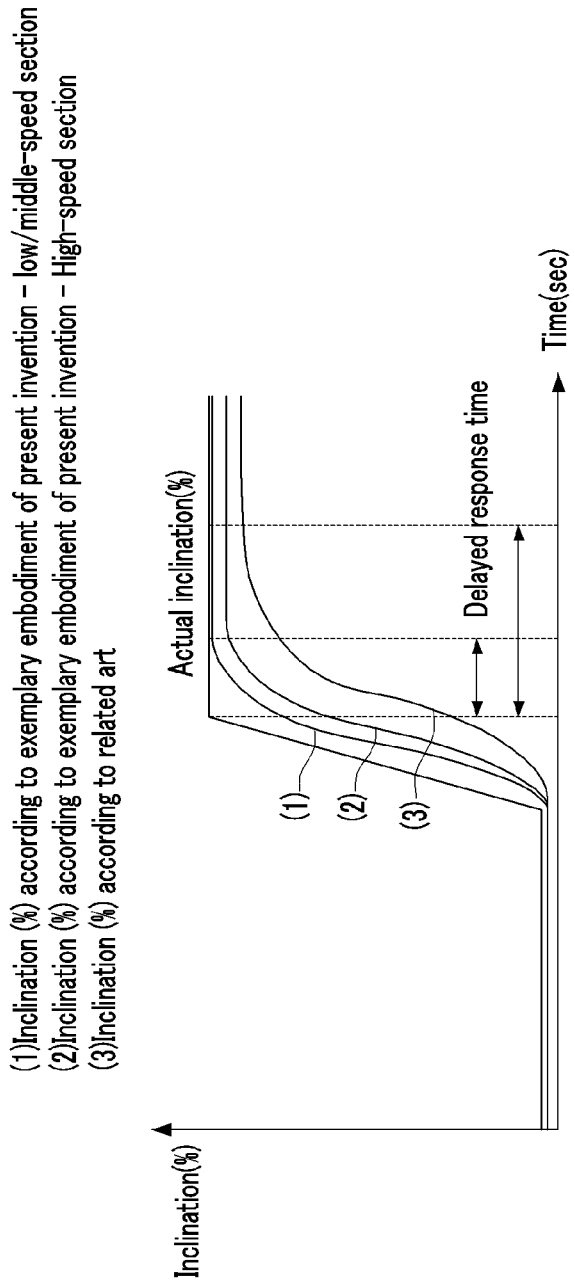
FIG. 9 is an exemplary graph illustrating improved performance of a system and a method of measuring an inclination of a vehicle using an acceleration sensor, according to an exemplary embodiment of the present invention.

FIG. 9 illustrates an improved response characteristic by adjusting a filter gain according to a vehicle speed by the filter gain adjusting unit 40 according to the exemplary embodiment of the present invention.

The output signal of the acceleration sensor 10 filtered through the high pass filter 30 and an original output signal of the acceleration sensor 10 may be input in the deduction unit 50. When the original output signal of the acceleration sensor 10 and the signal filtered by the high pass filter 30 are input in the deduction unit 50, the deduction unit 50 may deduct the signal filtered by the high pass filter 30 from the original output signal of the acceleration sensor 10 as illustrated in FIGS. 4A to 4C, and output only a signal of the acceleration sensor of a low frequency component corresponding to a cutoff frequency (fc) or lower of the high pass filter 30 (S300).

The signal output from the deduction unit 50 may be substantially similar to a signal passing through the low pass filter as described above. However, the high frequency component may be substantially removed in the signal output through the deduction unit 50.

The signal output from the deduction unit 50 may be input in an inclination calculation unit 60, controlled by the controller. When the output signal of the deduction unit 50 is input in the inclination calculation unit 60, the inclination calculation unit 60 may calculate an inclination based on the output signal of the inclination calculation unit 60 (S400).

The inclination calculated in the inclination calculation unit 60 may be directly transmitted to a location such as, an engine electronic control system and a transmission electronic control system, which require the inclination through the inclination output unit 90 to operate the vehicle in response to the inclination. However, since the inclination signal calculated by the inclination calculation unit 60 may include a sensor noise of the low frequency component of the acceleration sensor 10, the output signal (e.g., the inclination signal) of the inclination calculation unit 60 may be filtered by the low pass filter 70 (S500). The filter gain may be adjusted in the low pass filter 70 according to the vehicle speed by the filter gain adjusting unit 40 as described above.

However, since the low pass filtered inclination signal may be suddenly changed due to various factors, such as, an adverse effect by in rush current applied to the vehicle. Accordingly, the inclination change rate limit processing unit 80, controlled by the controller, of the present invention may receive the low pass filtered inclination signal, and when a change rate of the inclination signal is equal to or higher than a predetermined value (e.g., a change by 20% or higher compared to a previous signal), the inclination change rate limit processing unit 80 may output an inclination signal of a value limited to the predetermined value (e.g., a value limited to 20% of the input inclination angle signal) (S600 and S800).

The inclination change rate limit processing unit 80 may be optionally selected in consideration of a design aspect. Accordingly, when the inclination change rate limit processing unit 80 is not included, the present invention outputs the signal filtered by the low pass filter 70 as the inclination through the inclination output unit 90 (S700).

Accordingly, the present invention may improve response performance of the inclination measurement by adjusting to a driving state of the vehicle.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for measuring an inclination of a vehicle using an acceleration sensor, comprising:
    a high pass filter configured to high pass filter an output signal of the acceleration sensor that senses a driving acceleration of the vehicle;
    a controller configured to:
        deduct the output signal of the acceleration sensor filtered by the high pass filter from an original output signal of the acceleration sensor;
        calculate a deducted output signal of the acceleration sensor of a predetermined cutoff frequency or lower; and
        calculate an inclination based on the deducted output signal of the cutoff frequency or lower of the acceleration sensor, and
    a vehicle speed sensor configured to sense a vehicle speed, wherein the controller is further configured to set a gain of the high pass filter corresponding to the vehicle speed sensed by the vehicle speed sensor and apply the set gain to the high pass filter.

2. The system of claim 1, further comprising:
    a low pass filter configured to low pass filter a signal of the calculated inclination, wherein the controller is further configured to output the signal filtered by the low pass filter as an inclination signal.

3. The system of claim 2, wherein the controller is further configured to:
    output a value of the signal of the inclination signal, wherein the value is limited to a predetermined value when a change rate of the value of the inclination signal is equal to or greater than the predetermined value.

4. The system of claim 1, wherein the controller is further configured to set a gain of the low pass filter corresponding to the vehicle speed sensed by the vehicle speed sensor and apply the set gain to the low pass filter.

5. A method of measuring an inclination of a vehicle by using an acceleration sensor, comprising:
    filtering, by a high pass filter, an output signal of the acceleration sensor that senses a driving acceleration of the vehicle;
    deducting, by a controller, the high pass filtered output signal of the acceleration sensor from an original output signal of the acceleration sensor;
    calculating, by the controller, a deducted output signal of the acceleration sensor of a predetermined cutoff frequency or lower; and
    calculating, by the controller, an inclination based on the deducted output signal of the cutoff frequency or lower of the acceleration sensor;
    sensing, by a speed sensor, a vehicle speed;
    setting, by the controller, a gain of the high pass filter corresponding to the vehicle speed; and
    applying, by the controller, the set gain to the high pass filter.

6. The method of claim 5, further comprising:
    filtering, by a low pass filter, a signal of the calculated inclination; and
    outputting the low pass filtered signal as an inclination signal.

7. The method of claim 6, further comprising:
outputting a value of the inclination signal of a value, wherein the value is limited to a predetermined value when a change rate of the value of the inclination signal is equal to or greater than the predetermined value.

8. The method of claim 6, further comprising:
sensing, by the speed sensor, a vehicle speed;
setting, by the controller, a gain of the low pass filter corresponding to the vehicle speed; and
applying, by the controller, the set gain to the low pass filter.

9. A non-transitory computer readable medium containing program instructions executed by a processor or controller, the computer readable medium comprising:
program instructions that control a high pass filter to filter an output signal of the acceleration sensor that senses a driving acceleration of the vehicle;
program instructions that deduct the high pass filtered output signal of the acceleration sensor from an original output signal of the acceleration sensor;
program instructions that calculate a deducted output signal of the acceleration sensor of a predetermined cutoff frequency or lower;
program instructions that calculate an inclination based on the deducted output signal of the cutoff frequency or lower of the acceleration sensor;
program instructions that control a speed sensor to sense a vehicle speed;
program instructions that set a gain of the high pass filter pass corresponding to the vehicle speed; and
program instructions that apply the set gain to the high pass filter.

10. The computer readable medium of claim 9, further comprising:
program instructions that control a low pass filter to filter a signal of the calculated inclination; and
program instructions that output the low pass filtered signal as an inclination signal.

11. The computer readable medium of claim 10, further comprising:
program instructions that output a value of the inclination signal of a value, wherein the value is limited to a predetermined value when a change rate of the value of the inclination signal is equal to or greater than the predetermined value.

12. The computer readable medium of claim 10, further comprising:
program instructions that control the speed sensor to sense a vehicle speed;
program instructions that set a gain of the low pass filter corresponding to the vehicle speed; and
program instructions that apply the set gain to the low pass filter.

* * * * *